US 012455257B2

(12) United States Patent
Jung et al.

(10) Patent No.: US 12,455,257 B2
(45) Date of Patent: Oct. 28, 2025

(54) ELECTROCHEMICAL APTAMER BIOSENSOR THAT DETECTS TARGET MATERIAL

(71) Applicant: UIF (University Industry Foundation), Yonsei University, Seoul (KR)

(72) Inventors: Hyo Il Jung, Seoul (KR); Gurudatt Nanjanagudu Ganesh, Seoul (KR); Kyung Yeon Lee, Seoul (KR); Woong Heo, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 384 days.

(21) Appl. No.: 18/146,726

(22) Filed: Dec. 27, 2022

(65) Prior Publication Data

US 2023/0288364 A1    Sep. 14, 2023

(30) Foreign Application Priority Data

Jan. 12, 2022  (KR) ........................ 10-2022-0004576

(51) Int. Cl.
*G01N 27/327*     (2006.01)
*B82Y 15/00*      (2011.01)

(52) U.S. Cl.
CPC .......... *G01N 27/3278* (2013.01); *B82Y 15/00* (2013.01)

(58) Field of Classification Search
None
See application file for complete search history.

(56) References Cited

FOREIGN PATENT DOCUMENTS

| CN | 109609507 A | * | 4/2019 | ......... C12N 15/1048 |
|----|-------------|---|--------|------------------------|
| KR | 10-2015-0044280 A | | 4/2015 | |
| KR | 10-2018-0135668 A | | 12/2018 | |
| KR | 10-2019-0004537 A | | 1/2019 | |

OTHER PUBLICATIONS

F. Valentini, et al., "Oxidized Graphene in Ionic Liquids for Assembling Chemically Modified Electrodes: A Structural and Electrochemical Characterization Study", Analytical Chemistry, 84(13): p. 5823-5831, Jul. (Year: 2012).*

Zhihua Wang et al., "A Sandwich Nanostructure of Gold Nanoparticle Coated Reduced Graphene Oxide for Photoacoustic Imaging-Guided Photothermal Therapy in the Second NIR Window", Frontiers in Bioengineering and Biotechnology, Jun. 30, 2020, pp. 1-10, vol. 8.

(Continued)

*Primary Examiner* — J. Christopher Ball
(74) *Attorney, Agent, or Firm* — Paratus Law Group, PLLC

(57) ABSTRACT

Provided are an electrochemical aptamer biosensor that detects a target material, which is a phthalate-based material, a method of manufacturing the same, and a method of analyzing the target material using the same, and the electrochemical aptamer biosensor may be simply manufactured and may conveniently and quickly measure the target material, and may have a wide measurable concentration range of the target material and a low detection limit and thus may accurately and precisely measure a concentration of the target material in a sample for analysis.

16 Claims, 11 Drawing Sheets

Specification includes a Sequence Listing.

(56) References Cited

OTHER PUBLICATIONS

Korean Office Action for related KR Application No. 10-2022-0004576 mailed Jun. 2, 2024 from Korean Intellectual Property Office.

Dheyaa Hussein Mohsin et al., "Design of aptamer-based sensing platform using gold nanoparticles functionalized reduced graphene oxide for ultrasensitive detection of Hepatitis B virus", Chemical Papers, Aug. 4, 2020, pp. 279-295, vol. 75.

Chandrabhan Verma et al., "Ionic liquid-mediated functionalization of graphene-based materials for versatile applications: a review", Graphene Technology, Dec. 3, 2018, pp. 1-15, vol. 4.

Yuqing Chen et al., "A highly sensitive and group-targeting aptasensor for total phthalate determination in the environment", Journal of Hazardous Materials, Jan. 19, 2021, pp. 1-9, vol. 412, No. 125174.

\* cited by examiner

ELECTROCHEMICAL APTAMER BIOSENSOR THAT DETECTS TARGET MATERIAL

CROSS-REFERENCE TO RELATED APPLICATION

This application claims priority to Korean Patent Application No. 10-2022-0004576, filed on Jan. 12, 2022, which is hereby incorporated by reference in its entirety.

SEQUENCE LISTING

This application contains a Sequence Listing submitted via XML file and hereby incorporated by reference in its entirety. The Sequence Listing is named "432-0297_Sequence_Listing.xml", created on Dec. 21, 2022, modified on Dec. 22, 2022 and 2,040 bytes in size.

BACKGROUND

The present disclosure relates to an electrochemical aptamer biosensor that detects a target material, which is a phthalate-based material, a method of manufacturing the same, and a method of analyzing the target material using the same.

Phthalate-based materials are not only widely used for more than 80% of plasticizers used in plastic production, but are also used in lubricants, dispersants, gelling agents, adhesives, building materials, medical devices, personal care products, detergents and surfactants, packaging materials, children's toys, moisturizers, nail polish, liquid soaps, perfumes and hairsprays, textiles, and food products such as medicine, and are also used as ingredients for coating drugs.

However, when the phthalate-based materials are absorbed into the human body through the skin or the like, the phthalate-based materials not only enhance the activity of mutagenic materials, but also cause developmental disorders and interfere with the hormone function, impair fertility, and cause cancer.

However, current devices such as chromatographs for measuring phthalate-based materials are expensive, difficult to access, and difficult to achieve rapid and accurate measurements.

Accordingly, there is a need to introduce a technology capable of securing economic feasibility, and accurately and precisely measuring the phthalate-based materials.

SUMMARY

The purpose of solving the above problem is as follows.

The present disclosure is directed to providing an electrochemical aptamer biosensor including an electrode having conductivity, a composite graphene oxide layer located on the electrode and including graphene oxide plates and metal nanoparticles, and a plurality of target material-specific aptamers immobilized on the composite graphene oxide layer and having nanoparticles.

The present disclosure is also directed to providing a method of manufacturing the electrochemical aptamer biosensor, and a method for measuring a phthalate-based material, which is a target material, by using the electrochemical aptamer biosensor manufactured thereby.

According to an aspect of the present disclosure, there is provided an electrochemical aptamer biosensor including an electrode having conductivity, a composite graphene oxide layer located on the electrode and including a plurality of graphene oxide plates having a sandwich structure and metal nanoparticles, and a plurality of target material-specific aptamers immobilized on the composite graphene oxide layer and having nanoparticles.

The electrochemical aptamer biosensor may measure a concentration of a target material through an electrochemical signal that is reduced as the target material changes a shape of the target material-specific aptamer having nanoparticles.

The electrode may include one or more selected from the group consisting of carbon (C), gold (Au), platinum (Pt), and graphite.

The composite graphene oxide layer may further include an ionic liquid, and the graphene oxide plates may have the sandwich structure by $\pi$-$\pi$ interaction with the ionic liquid.

The target material-specific aptamer may include a DNA or RNA sequence having a thiol group at a 5'-end of the aptamer.

The target material-specific aptamer may have Thiol($C_6$) at 5'-end of a DNA sequence given as 5'-CTT TCT GTC CTT CCG TCA CAT CCC ACG CAT TCT CCA CAT-3' (SEQ ID No. 1).

The 5'-end of the target material-specific aptamer may specifically bind to the metal nanoparticles of the composite graphene oxide layer.

The nanoparticles may be bound to a 3'-end of the target material-specific aptamer.

The nanoparticles may be one or more particles selected from the group consisting of Methylene blue, Toludine blue O (TBO), Evans blue, Nile blue, and Neutral red.

The target material may be a phthalate-based material.

The electrochemical aptamer biosensor may have a measurable target material concentration of 0.14 pg/mL to 7 ng/mL.

The detection limit of the electrochemical aptamer biosensor may be 0.042 pg/mL or less.

According to another aspect of the present disclosure, there is provided a method of manufacturing an electrochemical aptamer biosensor, the method including: preparing a composite graphene oxide precursor, preparing a target material-specific aptamer precursor having nanoparticles; producing a first coating precursor by applying the composite graphene oxide precursor on an electrode having conductivity, producing a second coating precursor by applying the target material-specific aptamer precursor on the first coating precursor, and incubating the second coating precursor.

The composite graphene oxide precursor may include a graphene oxide plate, an ionic liquid, and metal nanoparticles.

A target material-specific aptamer having nanoparticles included in the target material-specific aptamer precursor may have a concentration of 1 nM to 200 nM.

In the incubating of the second coating precursor, an incubation time may be in a range of 15 minutes to 120 minutes.

According to still another aspect of the present disclosure, there is provided a method of analyzing a target material, the method including: providing a sample for analysis including the target material to an electrochemical aptamer biosensor; changing a shape of a target material-specific aptamer having nanoparticles by the target material; and measuring an electrochemical signal that is decreased due to the shape change.

In the providing of the sample for analysis including the target material, the time for providing the sample for analysis to the electrochemical aptamer biosensor may be in a range of 5 minutes to 40 minutes.

A use period of the electrochemical aptamer biosensor may be within 35 days from the date of manufacture.

An electrochemical aptamer biosensor according to one embodiment can be simply manufactured, conveniently and rapidly measure a target material, and have a wide measurable concentration range of the target material and a low detection limit and thus can accurately and precisely measure a concentration of a target material in a sample for analysis.

DETAILED DESCRIPTION

Figure 1:
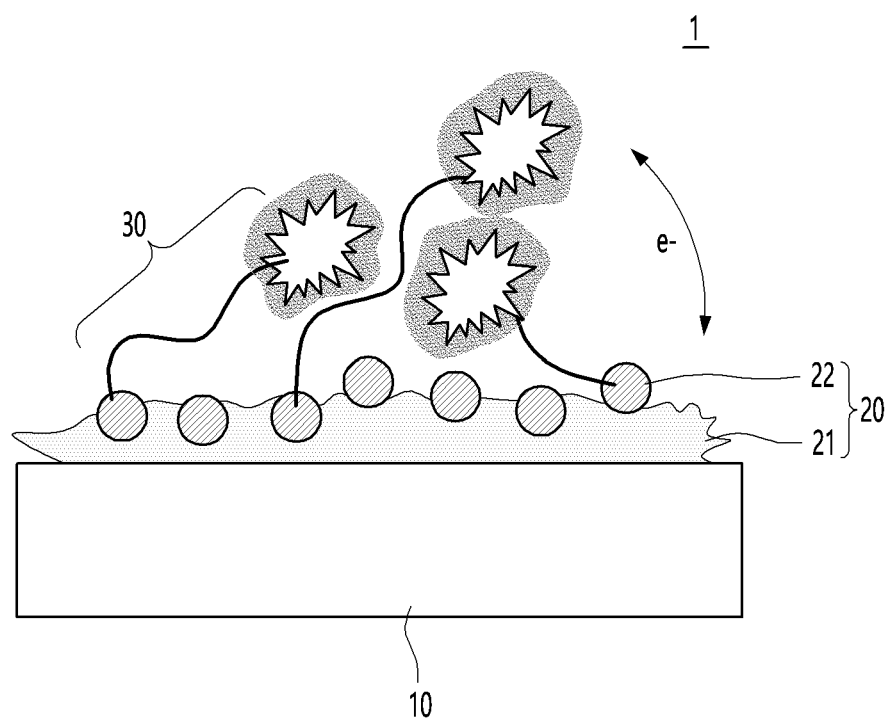
FIG. 1 is a schematic view schematically illustrating an electrochemical aptamer biosensor according to one embodiment.

The above objects, other objects, features, and advantages of the present disclosure will be easily understood through the following exemplary embodiments in conjunction with the accompanying drawings. However, the present disclosure is not limited to the embodiments described herein and may be embodied in other forms. Rather, the embodiments introduced herein are provided so that the disclosed content is thorough and complete, and the spirit of the present disclosure is sufficiently conveyed to those skilled in the art.

In describing each drawing, like reference numerals are used for like elements. In the accompanying drawings, the dimensions of structures are shown larger than their actual dimensions for the purpose of clarity of the present disclosure. Terms such as first and second may be used to describe various elements, but the elements should not be limited by the terms. The above terms are used only for the purpose of distinguishing one element from another element. For example, without departing from the scope of the present disclosure, a first element may be referred to as a second element, and similarly, a second element may be referred to as a first element. Singular expressions include plural expressions unless the context clearly indicates otherwise.

In the present disclosure, it is to be understood that terms such as "include" or "have" are intended to designate the presence of features, numbers, steps, actions, elements, parts, or combinations thereof described in the specification, but do not preclude the possibility of the presence or addition of one or more other features, numbers, steps, actions, elements, parts, or combinations thereof. In addition, when a part such as a layer, a film, a region, and a plate is said to be "on" another part, this includes cases where one part is "directly on" another part, as well as cases where there is still another part therebetween. Conversely, when a part such as a layer, a film, a region, and a plate is said to be "under" another part, this includes cases where the part is "directly under" another part, as well as cases where there is still another part therebetween.

Unless otherwise specified, all numbers, values, and/or expressions representing the amount of components, reaction conditions, polymer compositions and formulations used herein are to be understood to be modified by the term "about" in all cases, since these numbers are essentially approximations that reflect various uncertainties of measurements that occur in obtaining such values, among other things. Accordingly, it should be understood as being modified in all cases by the term "about." Further, when numerical ranges are disclosed herein, such ranges are continuous and, unless otherwise indicated, include all values from the minimum to the maximum values within the ranges. Moreover, when such ranges refer to an integer, all integers including the minimum to the maximum values are included therein, unless otherwise indicated.

In the present specification, when a range is described for a variable, it will be understood that the variable includes all values including end points described within the stated range. For example, the range of "5 to 10" will be understood to include any subranges, such as 6 to 10, 7 to 10, 6 to 9, 7 to 9, and the like, as well as individual values of 5, 6, 7, 8, 9, and 10, and will also be understood to include any value between valid integers within the stated range, such as 5.5, 6.5, 7.5, 5.5 to 8.5, 6.5 to 9, and the like. In addition, for example, the range of "10% to 30%" will be understood to include subranges, such as 10% to 15%, 12% to 18%, 20% to 30%, and the like, as well as all integers including values of 10%, 11%, 12%, 13%, and the like up to 30%, and will also be understood to include any value between valid integers within the stated range, such as 10.5%, 15.5%, 25.5%, and the like.

Conventional devices such as chromatographs for measuring phthalate-based materials are expensive, difficult to access, and difficult to achieve rapid and accurate measurements.

Accordingly, as a result of intensive research to solve the above problems, the inventors of the present disclosure found that, when an electrochemical aptamer biosensor including an electrode having conductivity, a composite graphene oxide layer including graphene oxide plates having a sandwich structure and metal nanoparticles, and a plurality of target material-specific aptamers having nanoparticles is prepared under specific conditions and used to measure a phthalate-based material, which is a target material, the target material may be measured conveniently and quickly, the electrochemical aptamer biosensor may be easily manufactured, and a concentration of the target material in a sample for analysis may be accurately and precisely measured because the concentration of the target material that can be measured is wide and a detection limit is low.

FIG. 1 is a schematic view schematically illustrating an electrochemical aptamer biosensor according to one embodiment. Referring to this, an electrochemical aptamer biosensor 1 according to one embodiment includes an electrode 10 having conductivity, a composite graphene oxide layer 20 located on the electrode and including a plurality of graphene oxide plates 21 having a sandwich structure and metal nanoparticles 22, a plurality of target material-specific aptamers 30 immobilized on the composite graphene oxide layer and having nanoparticles.

As used in the present disclosure, the term "aptamer" refers to an aptamer capable of specifically binding to a target material to be detected.

The electrode 10 may be an electrode having conductivity, specifically, an electrode having conductivity so that an electrochemical signal can be generated through an electrochemical interaction between the nanoparticles provided in the target material-specific aptamers and the composite graphene oxide layer, and for example, may include one or more selected from the group consisting of carbon (C), gold (Au), graphite, and platinum (Pt). The electrode 10 is not limited to including only a specific type, but may preferably include carbon, which is economically superior to other materials of similar conductivity and biocompatibility.

The electrode may have a shape that may serve as a basis for the electrochemical interaction between the nanoparticles provided in the target material-specific aptamers and the composite graphene oxide layer, such as a plate shape, a curved shape, an elliptical shape, a sphere shape, or a cube shape. The shape of the electrode is not limited to a specific shape, but may preferably be a plate shape capable of providing a 2D surface to which the metal nanoparticles can be efficiently attached.

The composite graphene oxide layer 20 is located on the electrode, and may include a plurality of graphene oxide plates having a sandwich structure and metal nanoparticles.

The target material-specific aptamers having nanoparticles may be immobilized on the composite graphene oxide layer, and thus an electrochemical signal may be generated through an electrochemical interaction between the graphene oxide plates in the graphene oxide layer and the nanoparticles.

Preferably, the composite graphene oxide layer may further include an ionic liquid. The ionic liquid may be a material that is capable of $\pi$-$\pi$ interaction with the graphene oxide plate, for example, a 1-ethyl-3-methylimidazolium (EMIM)-based ionic liquid, and specifically, may include one or more selected from the group consisting of 1-ethyl-3-methylimidazolium tetrafluoroborate, 1-ethyl-3-methylimidazolium chloride, 1-ethyl-3-methylimidazolium trifluoroethane sulfonate, 1-ethyl-3-methylimidazolium acetate, 1-ethyl-3-methylimidazolium dicyanamide, and 1-ethyl-3-methylimidazolium ethyl sulfate, and is not limited to including specific components.

Figure 2:
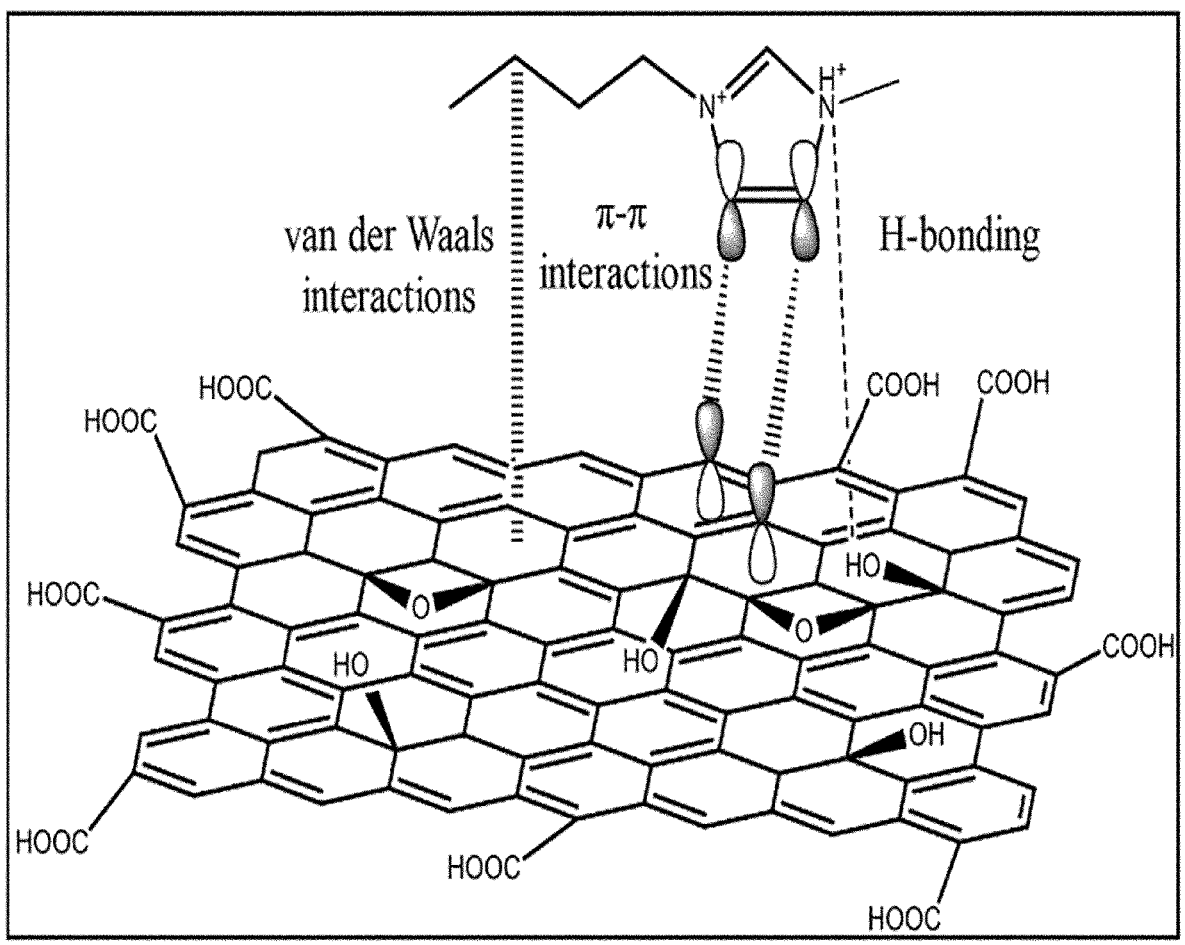
FIG. 2 is a schematic view illustrating an interaction relationship of graphene oxide plates included in a composite graphene oxide layer in the electrochemical aptamer biosensor according to one embodiment.

FIG. 2 is a schematic view illustrating an interaction relationship of the graphene oxide plates included in the composite graphene oxide layer in the electrochemical aptamer biosensor according to one embodiment.

Referring to this, the graphene oxide plates have a sandwich structure through $\pi$-$\pi$ interaction, and additionally, hydrogen (H)-bonding and van der Waals interaction with delocalized $\pi$ electrons of carbon atoms of a heterocyclic ring of the ionic liquid.

That is, the graphene oxide plates have better electronic conductivity by having a sandwich structure through $\pi$-$\pi$ interaction, additional H-bonding and van der Waals interaction, which are non-covalent interactions that maintain an $sp^3$ structure of carbon in the graphene oxide plates, rather than covalent bonds that distort the $sp^3$ structure, so that there is an advantage in that an electrochemical signal may be more excellently generated through the electrochemical interaction with the nanoparticles in the target material-specific aptamers.

The metal nanoparticles are included in the composite graphene oxide layer, and may specifically bind to the target material-specific aptamers having nanoparticles to immobilize the target material-specific aptamers having nanoparticles on the composite graphene oxide layer.

The metal nanoparticles may include particles capable of specific binding to the target material-specific aptamers having nanoparticles, for example, one or more selected from the group consisting of gold (Au), platinum (Pt), and silver (Ag), and are not limited to specific particles, but preferably, may be gold (Au) nanoparticles having excellent biocompatibility and electrical conductivity as well as ease of manufacture and excellent chemical bonding.

The target material-specific aptamers having nanoparticles may be immobilized on the composite graphene oxide layer, preferably, on the metal nanoparticles included in the composite graphene oxide layer, and may generate an electrochemical signal through electrochemical interaction between the graphene oxide plates in the composite graphene oxide layer and the nanoparticles.

The nanoparticles may be particles capable of providing a stable surface for immobilizing the target material-specific aptamers through interaction with a thiol group in the target material-specific aptamer, and may include particles capable of enhancing the intensity of an electrochemical signal on a sensor surface, for example, one or more particles selected from the group consisting of Methylene blue (MB), Toludine blue O (TBO), Evans blue, Nile blue, and Neutral red, and may preferably include Methylene blue (MB) nanoparticles with excellent aptamer molecule attachment.

The target material-specific aptamer may be a DNA or RNA sequence capable of binding to the nanoparticles, preferably single-stranded DNA (ssDNA), and may be a target material-specific aptamer whose shape can be changed such that the electrochemical signal is reduced when a redox reaction occurs between the bound nanoparticles and a target material included in a sample for analysis.

The target material-specific aptamer may additionally include six carbons in order to increase the efficiency of the redox reaction between the provided nanoparticles and the target material, and in particular, may be a DNA or RNA sequence having a thiol group at a 5'-end of the target material-specific aptamer for specific binding to the metal nanoparticles in the composite graphene oxide layer.

Preferably, the target material-specific aptamer may have Thiol $C_6$ at 5'-end of a DNA sequence given as 5'-CTT TCT GTC CTT CCG TCA CAT CCC ACG CAT TCT CCA CAT-3' (SEQ ID No. 1).

Meanwhile, in the target material-specific aptamers having nanoparticles, since the nanoparticles may be bound to a 3'-end, the target material-specific aptamer having nanoparticles may have Thiol $C_6$ at 5'-end of a DNA sequence given as 5'-CTT TCT GTC CTT CCG TCA CAT CCC ACG CAT TCT CCA CAT-3' (SEQ ID No. 1), and MB bound at 3'-end.

For example, the target material may include, as the phthalate-based material, one or more selected from the group consisting of di-n-butylphthalate (DBP), dimethyl phthalate (DMP), di(2-ethylhexyl) phthalate (DEHP), di-n-propyl phthalate (DPP), diethyl phthalate (DEP), diisononyl phthalate (DINP), butyl benzyl phthalate (BBP), diisobutyl phthalate (DIBP), and is not limited to a specific material, but preferably, may include di-n-butylphthalate (DBP).

The electrochemical aptamer biosensor according to one embodiment satisfies the above configuration, and thus has an advantage of accurately and precisely measuring a concentration of a target material in a sample for analysis because the concentration of the target material that can be measured is in a wide range of 0.14 pg/mL to 7 ng/mL, and a detection limit is 0.042 pg/mL or less and very low.

A method of manufacturing an electrochemical aptamer biosensor according to another embodiment includes preparing a composite graphene oxide precursor (S10), preparing a target material-specific aptamer precursor having nanoparticles (S20), preparing a first coating precursor by applying the composite graphene oxide precursor on an electrode having conductivity (S30), preparing a second coating precursor by applying the target material-specific aptamer precursor on the first coating precursor (S40), and incubating the second coating precursor (S50).

The preparing of the composite graphene oxide precursor (S10) is an operation of preparing a composite graphene oxide layer located on an electrode. In this case, the composite graphene oxide precursor may include graphene oxide plates, an ionic liquid, and metal nanoparticles.

Here, when the content described in the electrochemical aptamer biosensor and a content used for describing the method of manufacturing the electrochemical aptamer biosensor overlap, the description of the overlapping content may be omitted.

Specifically, graphene oxide plates may be added to a solvent such as deionized water and subjected to sonication to obtain a suspension, and then an ionic liquid may be further added to the suspension to prepare a mixture. Through the addition of the ionic liquid, the graphene oxide plates may have a sandwich structure through π-π interaction, and additionally, H-bonding and van der Waals interaction with delocalized π electrons of carbon atoms of a heterocyclic ring of the ionic liquid.

Thereafter, a solution containing metal nanoparticles may be added to the suspension in which the ionic liquid is additionally added, and then subjected to sonication to finally prepare a composite graphene oxide precursor.

In this case, a volume ratio of the suspension to which the ionic liquid is additionally added and the solution including the metal nanoparticles may be in a range of 1:0.5 to 1:3 (v/v). When the volume ratio of the metal nanoparticles is below the above range, there is a disadvantage in that a small amount of metal nanoparticles are provided on a composite surface, and when the volume ratio of the metal nanoparticles exceeds the above range, there is a disadvantage in that the metal nanoparticles are oversaturated to reduce economic feasibility.

In the preparing of the target material-specific aptamer precursor having nanoparticles (S20), a cryopreserved target material-specific aptamer aggregate may be prepared, and then pre-treated at a high temperature for a predetermined period of time. Specifically, the target material-specific aptamer aggregate may be pre-treated at a temperature of 90° C. to 100° C. for 1 minute to 9 minutes to denature a DNA or RNA sequence included in the target material-specific aptamer, and preferably, to denature ssDNA.

Thereafter, the pre-treated target material-specific aptamer aggregate may be cooled again, preferably at a temperature of 0° C. to 8° C. for 10 minutes to 20 minutes.

Thereafter, the cooled target material-specific aptamer aggregate may be put into a bond cleaving solution and then incubated to finally prepare the target material-specific aptamer precursor.

In this case, the bond cleaving solution may be a solution capable of cleaving disulfide bonds in the target material-specific aptamer, for example, a solution containing one or more selected from the group consisting of a tris(2-carboxyethyl) phosphine (TCEP) solution, a 2-mercaptoethanol solution, a dithiothreitol solution, and a dithioerythritol solution, and preferably, a TCEP solution, which is the most efficient DNA reducing agent. In addition, the incubating may be performed at room temperature (20° C. to 25° C.) for 0.5 to 1.5 hours. When the incubation time is below the above range, there is a disadvantage in that the aptamer is not completely reduced.

Accordingly, the target material-specific aptamer having nanoparticles included in the target material-specific aptamer precursor may have a concentration of 1 nM to 200 nM, and preferably, 1 nM to 10 nM. When the concentration of the aptamer is below the above range, sensor sensitivity may be reduced since the surface may not be completely covered, and when the concentration of the aptamer exceeds the above range, economic feasibility is reduced.

In the preparing of the first coating precursor (S30), the composite graphene oxide precursor may be applied on the electrode having conductivity to prepare the first coating precursor.

Specifically, the composite graphene oxide precursor prepared in S10 may be applied on the electrode having conductivity and then dried at room temperature (20° C. to 25° C.).

Here, the coating method may be a conventional coating method that may be used in a field similar to the present disclosure, and preferably, a drop coating method.

Thereafter, the composite graphene oxide precursor applied on the electrode having conductivity may be washed with deionized water and then dried with an inert gas to prepare the first coating precursor.

The preparing of the second coating precursor (S40) is an operation of preparing a second coating precursor by applying the target material-specific aptamer precursor on the first coating precursor.

Specifically, after preparing the target material-specific aptamer precursor having nanoparticles (S20) and the first coating precursor (S30), the target material-specific aptamer precursor having nanoparticles may be applied on the first coating precursor. Here, the coating method may be the same as or different from the method used in preparing the first coating precursor.

In the incubating of the second coating precursor (S50), the target material-specific aptamer precursor having nanoparticles applied on the first coating precursor may be incubated in a humidified atmosphere (90% to 95%) at room temperature (20° C. to 25° C.) for 15 to 120 minutes to finally manufacture the electrochemical aptamer biosensor. In this case, when the atmosphere is a dry atmosphere outside the above range, there is a disadvantage in that an electrode surface is dried and the aptamer is physically adsorbed on the electrode surface and thus the electrode surface may be unstable.

Thereafter, the incubated second coating precursor is washed with deionized water and then dried with an inert gas to finally manufacture the electrochemical aptamer biosensor.

The electrochemical aptamer biosensor according to another embodiment may be manufactured in a relatively simple manner as described above, and thus has excellent economic feasibility and efficiency in terms of manufacturing costs and manufacturing time.

A method of analyzing a target material according to still another embodiment includes providing a sample for analysis including a target material to the electrochemical aptamer biosensor, changing a shape of the target material-specific aptamer having nanoparticles by the target material, and measuring an electrochemical signal reduced by the shape change.

Here, when the content described in the electrochemical aptamer biosensor and a content for describing the target material analysis method overlap, the description of the overlapping content may be omitted.

The providing of the sample for analysis is an operation of providing a sample for analysis including a target material to the electrochemical aptamer biosensor manufactured by the manufacturing method.

The sample for analysis is a sample including the target material, and may be a sample to be measured, such as the water of a river or stream.

Specifically, the time for providing the sample for analysis to the electrochemical aptamer biosensor is the minimum time required for the shape of the aptamer to be changed through a redox reaction between the target material in the sample for analysis and the target material-specific aptamer having nanoparticles in the electrochemical aptamer biosensor, and may preferably be 5 to 40 minutes. When the providing time is below the above range, there is a disadvantage in that the interaction between the aptamer in the biosensor and the target material is insufficient.

In the changing of the shape of the target material-specific aptamer having nanoparticles by the target material and the measuring of the electrochemical signal reduced due to the shape change, an electrochemical signal generated through electrochemical interaction between the nanoparticles and the composite graphene oxide layer after the shape of the aptamer is changed through the redox reaction between the target material-specific aptamer having nanoparticles and the target material, and as a result, may have a smaller intensity than an electrochemical signal generated through electrochemical interaction between the nanoparticles and the composite graphene oxide layer before the shape of the aptamer is changed.

Accordingly, by measuring the relative intensity of the electrochemical signal that is relatively weakened by the shape change of the aptamer caused by the redox reaction of the nanoparticles, there is an advantage in that a detection limit may be 0.042 pg/mL or less, and the presence or absence of the target material and a concentration of the target material in a range of 0.14 pg/mL to 7 ng/mL may be measured in various ways. A use period of the electrochemical aptamer biosensor according to one embodiment having such an advantage may be within 35 days from the date of manufacture.

Accordingly, the electrochemical aptamer biosensor according to one embodiment may be simply manufactured, have excellent durability, and have a wide measurable concentration range of the target material and a low detection limit, so that there is an advantage in that a concentration of a target material in a sample for analysis may be accurately and precisely measured.

Hereinafter, the present disclosure will be described in more detail through examples. The following examples are merely examples for helping understanding of the present disclosure, and the scope of the present disclosure is not limited thereto.

Example 1: Manufacture of Electrochemical Aptamer Biosensor 25 mg of graphene oxide plates (nanoplatelets) were added to 50 mL of deionized water and sonicated for 2 hours to obtain a homogeneous suspension (S10). Thereafter, 100 mg of 1-ethyl-3-methylimidazolium chloride, which is a hydrophilic and protic ionic liquid, was added to the suspension, and sonication continued for 20 minutes. The formed mixture was magnetically stirred at 50° C. for 4 hours to prepare a mixture, washed several times by ultracentrifugation with deionized water and methanol, and finally resuspended in 20 mL of methanol and stored at 4° C. for further use.

Meanwhile, a 1% (wt.) $HAuCl_4$ solution was prepared in deionized water as a solution containing metal nanoparticles, and magnetic stirred at 60° C. for 1 hour. This may result in the formation of metallic gold nanoparticles (AuNPs) due to the ionization of gold chloride salts at a high temperature in a polar solvent.

Thereafter, the mixture containing the graphene oxide plates and the ionic liquid and the solution containing the metal nanoparticles were mixed in a ratio of 1:2 (v/v), and then sonicated for 2 hours.

Thereafter, the mixture was washed with deionized water to remove free nanoparticles, resuspended in water, and stored at 4° C. until further use, thereby finally preparing a composite graphene oxide precursor.

Aliquots of 5 µL of frozen 5' thiol-modified DBP aptamer, which is a target material-specific aptamer having nanoparticles, (a DNA sequence given as 5'-CTTTCTGTCCTTCCGTCACATCCCACGCATTCTC-CACAT-3' (SEQ ID No. 1) with C6 SH at the 5'-end and MB bound at 3' end) (ordered from BIONEER Corporation (Daejeon, Korea)) aggregate were prepared.

The aptamer aggregate were then pre-treated at 95° C. for 5 minutes to denature ssDNA molecules and then cooled at 4° C. for 15 minutes for regeneration. Thereafter, the aptamer aggregate was diluted with a 5 mM TCEP solution (1:4) as a bond cleaving solution and incubated at room temperature for 1 hour to finally prepare a target material-specific aptamer precursor having nanoparticles. Through this, the disulfide bond could be cleaved and the aptamer molecules could be unfolded.

As an electrode having conductivity, a disposable screen-printed carbon electrode (SPCE) (DRP-C110) purchased from Metrohm Dropsens Inc. (Spain) was prepared (S30).

Thereafter, the graphene oxide precursor prepared in S10 was drop-coated on the electrode having conductivity and completely dried at room temperature. The formed electrode surface was then washed with deionized (DI) water and dried with $N_2$ gas to prepare a first coating precursor.

The target material-specific aptamer precursor having nanoparticles prepared in S20 was drop-coated on the first coating precursor to prepare a second coating precursor (S40).

The second coating precursor was then incubated in a humidified atmosphere (90%) at room temperature (20° C. to 25° C.) for 120 minutes (S50). Thereafter, the second coating precursor was washed with deionized water and gently dried with $N_2$ gas. In addition, the second coating precursor was treated with a 10 mM MCH solution for 5 minutes, washed with deionized water, and dried at room temperature to finally manufacture the electrochemical aptamer biosensor.

Experimental Example 1: Electrochemical Aptamer Biosensor Performance Optimization Review The electrochemical aptamer biosensor was manufactured according to Example 1 and an optimization review thereof was performed.

Figure 3A:
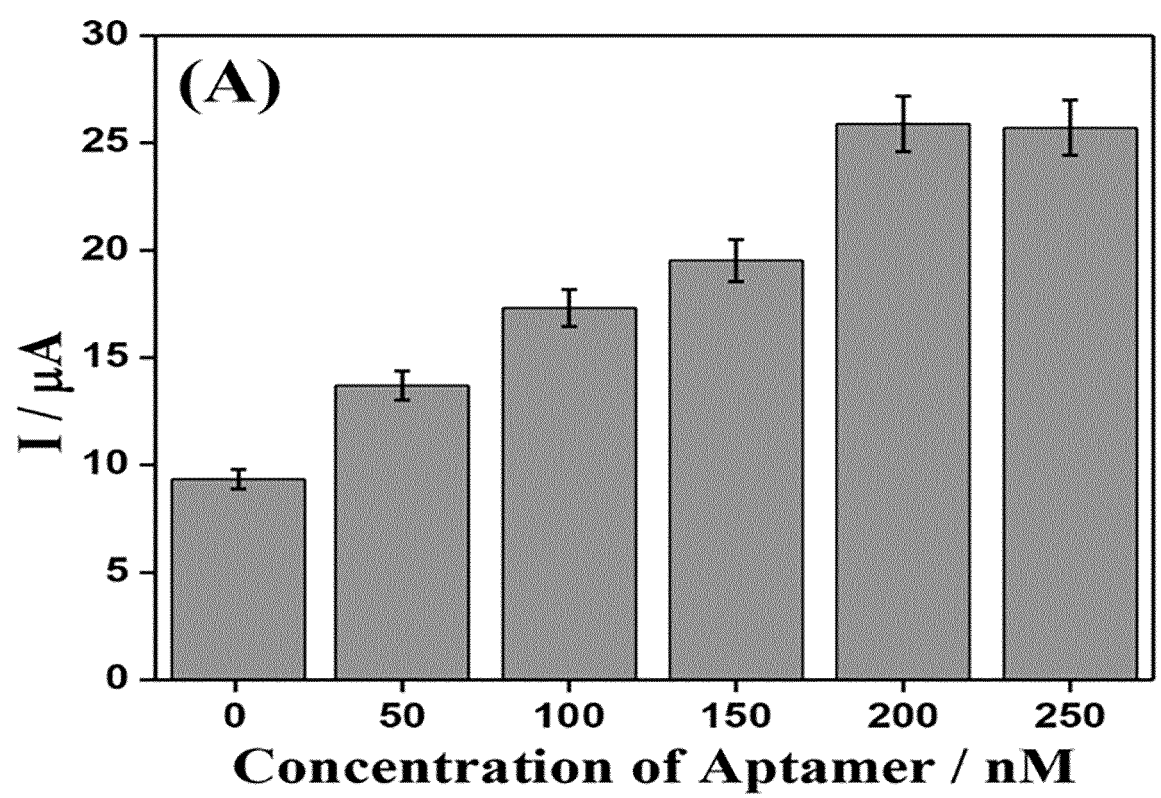
FIG. 3A is a graph of an electrochemical current, which is measured by an electrochemical aptamer biosensor according to Example 1, according to a concentration of a target material-specific aptamer having nanoparticles included in a target material-specific aptamer precursor.

First, in order to determine the concentration of the target material-specific aptamer having nanoparticles, optimization was performed by adjusting the concentration of the target material-specific aptamer precursors having nanoparticles from 1 nM to 250 nM, and results thereof are shown in FIG. 3A. Here, electrochemical current due to the reduction of the nanoparticles was observed as a determinant for the optimization of the concentration of the aptamer precursor.

Specifically, FIG. 3A is a graph of the electrochemical current, which is measured by the electrochemical aptamer biosensor according to Example 1, according to the concentration of the target material-specific aptamers having nanoparticles included in the target material-specific aptamer precursor.

Referring to FIG. 3A, from 1 nM to 200 nM, a reduction signal of the electrochemical current is gradually increased. Beyond that, the reduction signal of the electrochemical current remained constant with further increases in the aptamer concentration, indicating saturation of the aptamer.

Accordingly, it could be confirmed that the concentration of the target material-specific aptamer having nanoparticles included in the target material-specific aptamer precursor was optimal when the concentration is 200 nM.

Meanwhile, in order to confirm the time required for the target material-specific aptamer having nanoparticles included in the target material-specific aptamer precursor to be immobilized on the first coating precursor, that is, an incubation time of the second coating precursor, measurement was performed using an electrochemical signal.

Figure 3B:
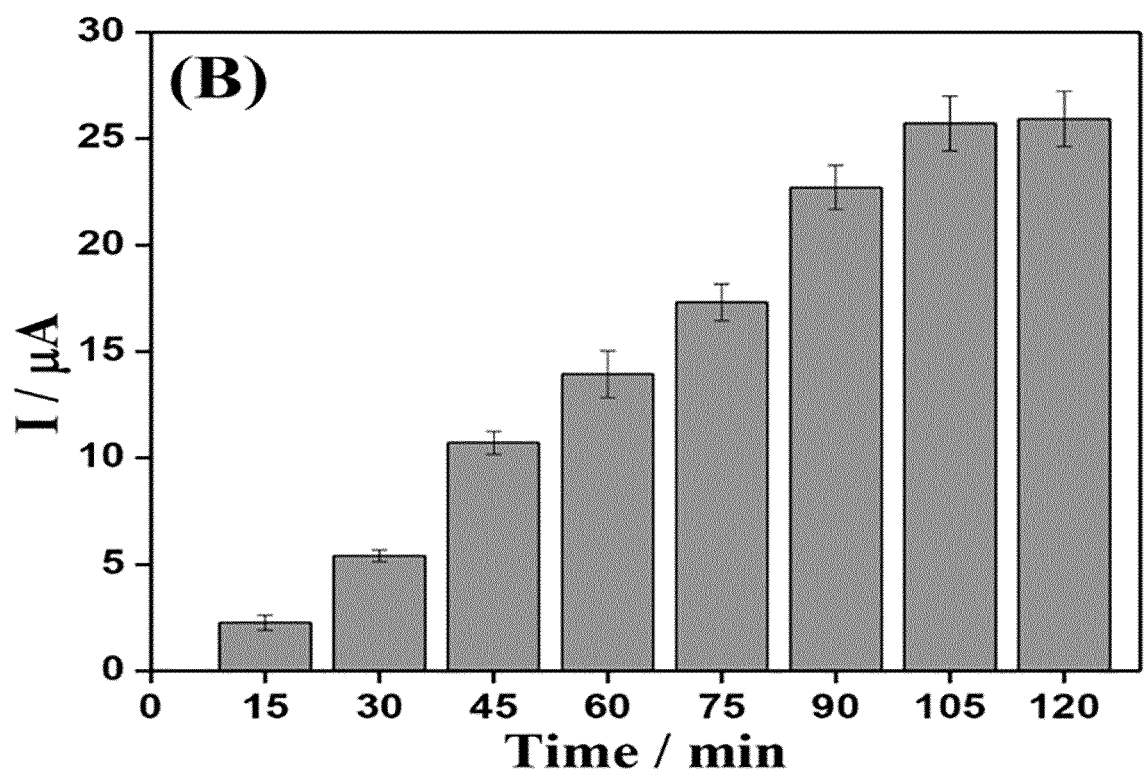
FIG. 3B is a graph of an electrochemical current, which is measured by the electrochemical aptamer biosensor according to Example 1, according to an incubation time of a second coating precursor.

Specifically, FIG. 3B is a graph of the electrochemical current, which is measured by the electrochemical aptamer biosensor according to Example 1, according to the incubation time of the second coating precursor.

Referring to FIG. 3B, the electrochemical signal exhibits a minimum current response only after 15 minutes of incubation at room temperature and the required minimum time is indicated as 15 minutes. Thereafter, it could be confirmed that the signal continuously increases in intensity in proportion to the incubation time. The electrochemical signal then reached convergence at 110 minutes, after which little or no increase in the electrochemical signal was observed.

Accordingly, it could be confirmed that, when the incubation time of the second coating precursor at room temperature under humidified atmosphere is 120 minutes, this is optimal for immobilizing the aptamer to the first coating precursor.

In addition, in order to analyze the optimal time for providing the sample for analysis to the electrochemical aptamer biosensor as the time required for the target material-specific aptamer having nanoparticles included in the target material-specific aptamer precursor to react with the target material, a standard DBP solution, which is a target material, was provided to the electrochemical aptamer biosensor according to Example 1 in DI water and then incubated.

In this case, in order to determine the optimal time, a DBP incubation time and a change in a reduction current I according to blank reading of the electrochemical aptamer biosensor according to Example 1 without incubating DBP were measured on the sensor surface.

Figure 3C:
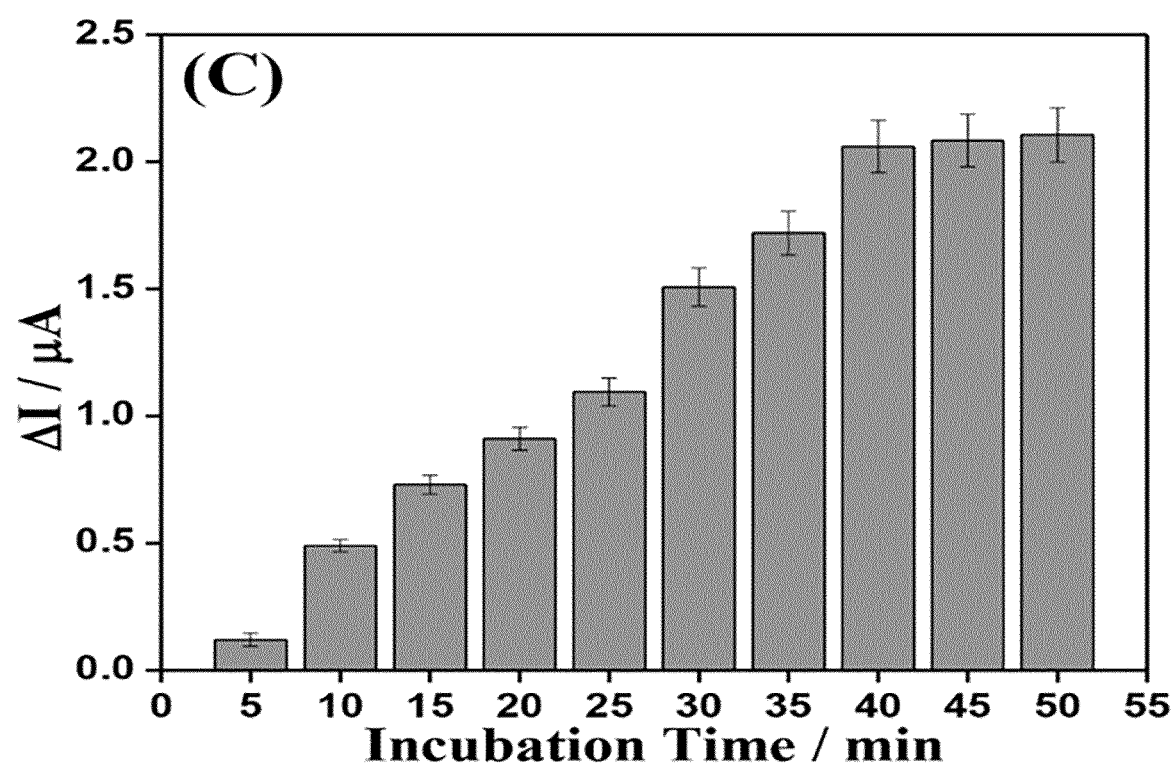
FIG. 3C is a graph reflecting a change in a reduction current (I) of an electrochemical signal, which is measured by the electrochemical aptamer biosensor according to Example 1, according to a supply time (incubation time) of a standard di-n-butylphthalate (DBP) solution that is a target material.

Specifically, FIG. 3C is a graph reflecting a change in the reduction current I of the electrochemical signal, which is measured by the electrochemical aptamer biosensor according to Example 1, according to the supply time (incubation time) of the standard DBP solution that is a target material.

Referring to this, it could be confirmed that a change in a signal current was steadily increased in the electrochemical signal from 5 minutes to 40 minutes, after that, the change was insignificant and exhibited a stable state up to more than 50 minutes.

That is, it could be confirmed that the time (incubation time) required for the target material-specific aptamer having nanoparticles included in the target material-specific aptamer precursor to react with the target material was 40 minutes, which is the optimal time.

Experimental Example 2: Electrochemical Signal Detection of Target Material

The electrochemical aptamer biosensor according to Example 1 was prepared, and in order to electrochemically detect DBP, which is a target material, a stock solution of 10 µM (13.9 ng/ml) was prepared in DI water and diluted as needed.

Specifically, the interaction between the electrochemical aptamer biosensor according to Example 1 and DBP present in water was monitored using differential pulse voltammetric (DPV) measurement with a reduction peak at 0.55 V.

First, a blank reading of the electrochemical aptamer biosensor according to Example 1 was measured using DPV. When the shape of the electrochemical aptamer biosensor according to Example 1 is modified, a clear reduction peak was observed in phosphate buffered saline (PBS) (for electrochemical measurement).

Thereafter, various concentrations of DBP diluted in the electrochemical aptamer biosensor according to Example 1 were provided and incubated. The resulting electrochemical signal reduction was compared to previously measured blank readings to quantify the DBP concentration of the water sample, and results thereof are shown in FIG. 4A.

Figure 4A:
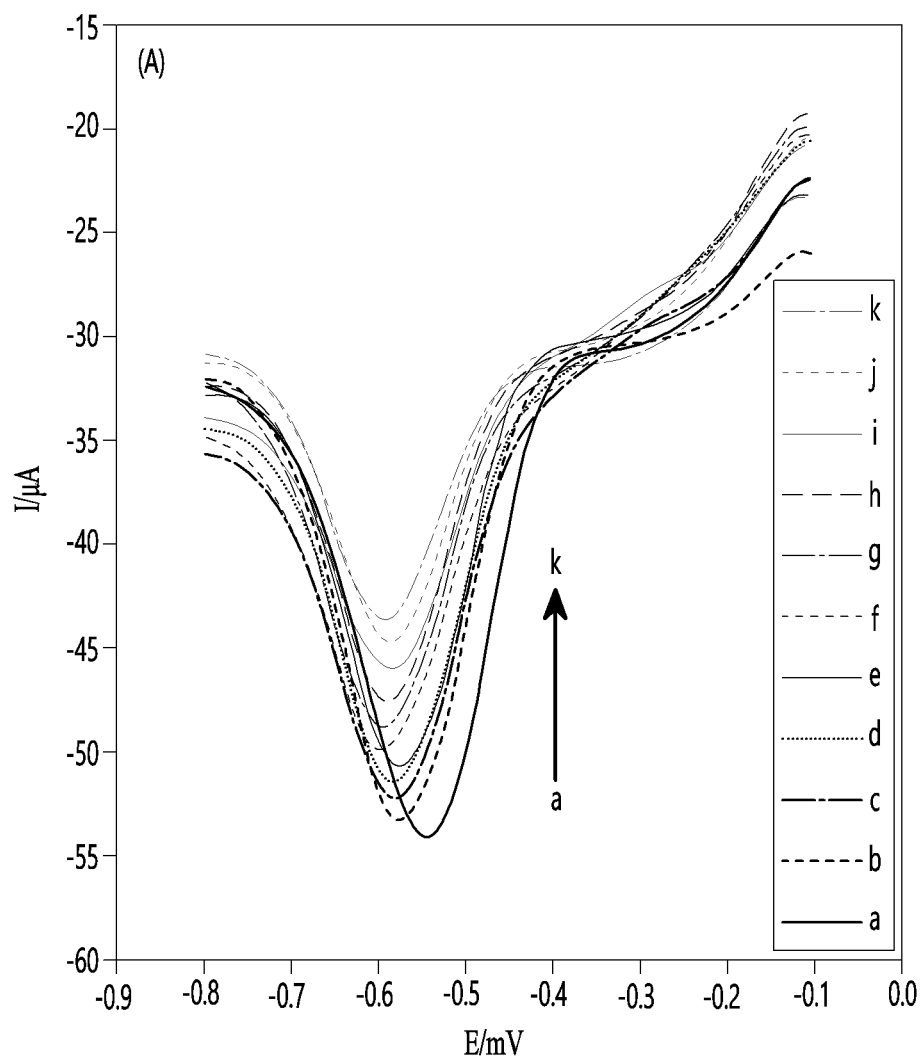
FIG. 4A is a graph illustrating differential pulse voltammetric (DPV) measurement results for the electrochemical aptamer biosensor according to Example 1 according to concentrations ((a) blank, (b) 0.14 pg/mL, (c) 1.4 pg/mL, (d) 14.0 pg/mL, (e) 0.14 ng/mL, (f) 0.35 ng/ml, (g) 0.7 ng/mL, (h) 1.4 ng/mL, (i) 3.0 ng/ml, (j) 4.0 ng/mL, and (k) 7.0 ng/ml) of the target material.

Specifically, FIG. 4A is a graph illustrating DPV measurement results for the electrochemical aptamer biosensor according to Example 1 according to the concentration of the target material.

Referring to FIG. 4A, it could be confirmed that the electrochemical signal was steadily increased from 0.14 pg/mL to 7 ng/mL, and above that, the composite graphene oxide layer exhibited a saturation state because "I" showed an irregular behavior and did not correlate with a concentration profile.

Figure 4B:
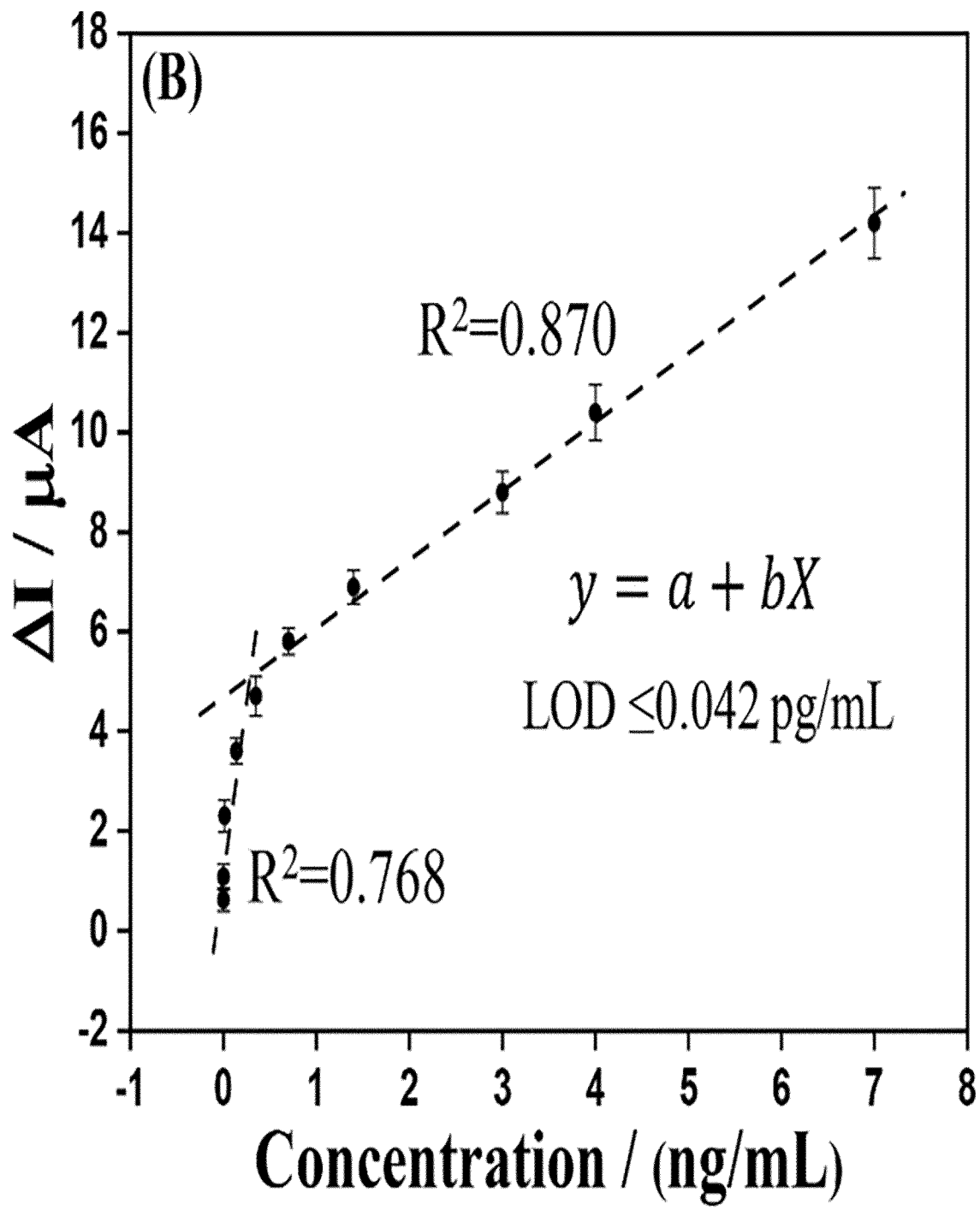
FIG. 4B is a linear plot graph in which a change in an electrochemical signal of the electrochemical aptamer biosensor according to Example 1, which is measured according to the target material concentration, is linearly corrected.

In addition, FIG. 4B is a linear plot graph in which a change in the electrochemical signal of the electrochemical aptamer biosensor according to Example 1, which is measured according to a target material concentration, is linearly corrected.

Referring to FIG. 4B, it could be confirmed that, from 0.14 pg/mL to 0.35 ng/mL, linearity was well maintained, and when the concentration exceeds the above range, the slope of the linear curve changes, indicating a change in reaction kinetics at higher analyte concentrations.

Accordingly, it could be confirmed that the electrochemical aptamer biosensor according to Example 1 exhibits a detection limit of 0.042 pg/mL on the basis of the standard deviation of the blank.

Experimental Example 3: Examination of Selectivity, Stability, and Reproducibility of Electrochemical Aptamer Biosensor An interference effect on the electrochemical signal of the electrochemical aptamer biosensor according to Example 1 due to different phthalate esters was examined to determine selectivity for the DBP molecule that is a target material.

The signal generation of different phthalate esters under optimized conditions was examined in a three-electrode system using a CH Instruments potentiostat (CHI-650E, USA) for each phthalate ester.

Figure 5A:
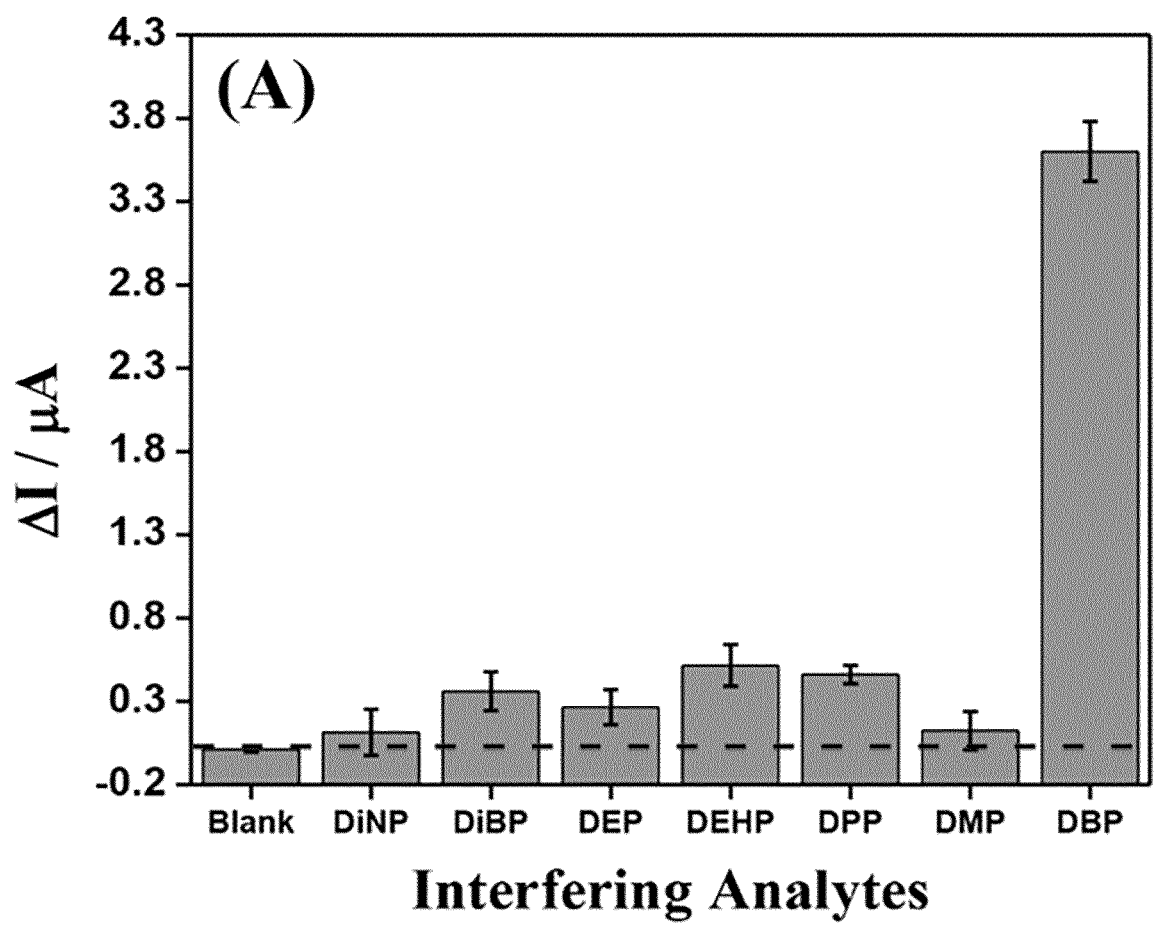
FIG. 5A is a graph illustrating the results of examining an interference effect on the electrochemical signal of the electrochemical aptamer biosensor according to Example 1 due to DBP, which is a target material, and phthalate esters such as dimethylphthalate (DMP), di(2-ethylhexyl) phthalate (DEHP), diphenyl phthalate (DPP), diethylphthalate (DEP), diisononyl phthalate (DINP), benzylbutyl phthalate (BBP), and diisobutylphtalate (DIBP).

Specifically, six different phthalate esters, which are the most likely structural analogues of DBP that is a target material and most commonly used in plastic production and found in the environment, were selected and examined at the same concentration (0.15 ng/ml) as DBP, and results thereof are shown in FIG. 5A.

In this case, the six different phthalate esters were dimethylphthalate (DMP), di(2-ethylhexyl) phthalate (DEHP), diphenyl phthalate (DPP), diethylphthalate (DEP), diisononyl phthalate (DINP), benzylbutyl phthalate (BBP), and diisobutylphtalate (DIBP).

Specifically, FIG. 5A is a graph illustrating the results of examining the interference effect on the electrochemical signal of the electrochemical aptamer biosensor according to Example 1 due to DBP, which is a target material, and the phthalate esters, dimethylphthalate (DMP), di(2-ethylhexyl) phthalate (DEHP), diphenyl phthalate (DPP), diethylphthalate (DEP), diisononyl phthalate (DINP), benzylbutyl phthalate (BBP), and diisobutylphtalate (DIBP).

Referring to FIG. 5A, it could be confirmed that the DEHP signal was 14.3% of the DBP signal when the concentration was doubled, in contrast, DPP along with DiBP and DEP, which are isomers of DBP, exhibited the maximum intensity in the current change as compared to the other phthalates.

However, the difference between DPB and other phthalate esters was negligible, which may be due to the high specificity of the aptamer and the avoidance of non-specific binding by MCH.

Figure 5B:
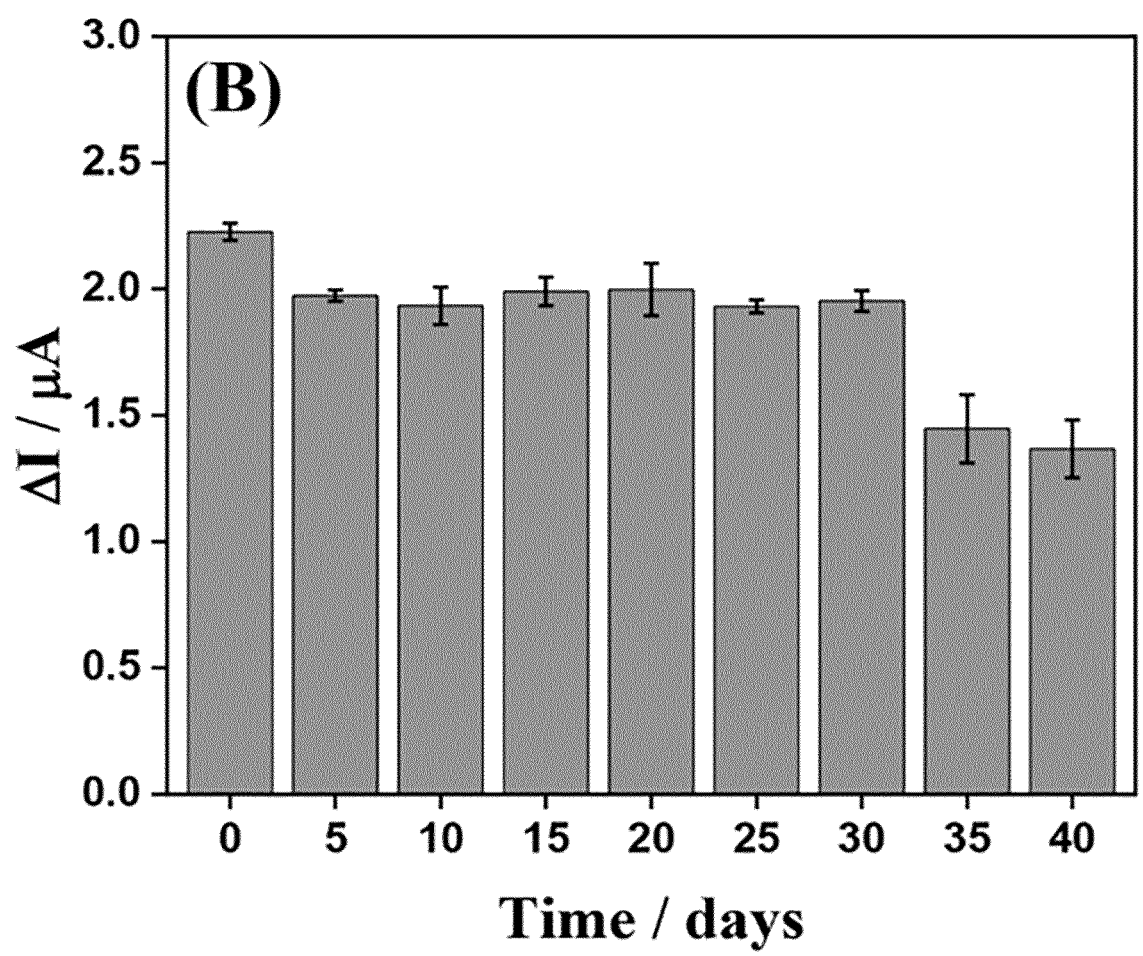
FIG. 5B is a graph illustrating the results of analyzing the electrochemical signal reduction of the electrochemical aptamer biosensor according to Example 1 at intervals of 5 days.

Meanwhile, in order to confirm the stability of the electrochemical aptamer biosensor, the electrochemical aptamer biosensor according to Example 1 was prepared, DBP, which is a target material, was provided (incubated), and then, electrochemical signal reduction was analyzed at intervals of 5 days, and results thereof are shown in FIG. 5B.

Specifically, FIG. 5B is a graph illustrating the results of analyzing the electrochemical signal reduction of the electrochemical aptamer biosensor according to Example 1 at intervals of 5 days.

Referring to this, at the proposed detection surface, a stable response was maintained even after 4 weeks, but the signal was rapidly reduced after 35 days.

Figure 5C:
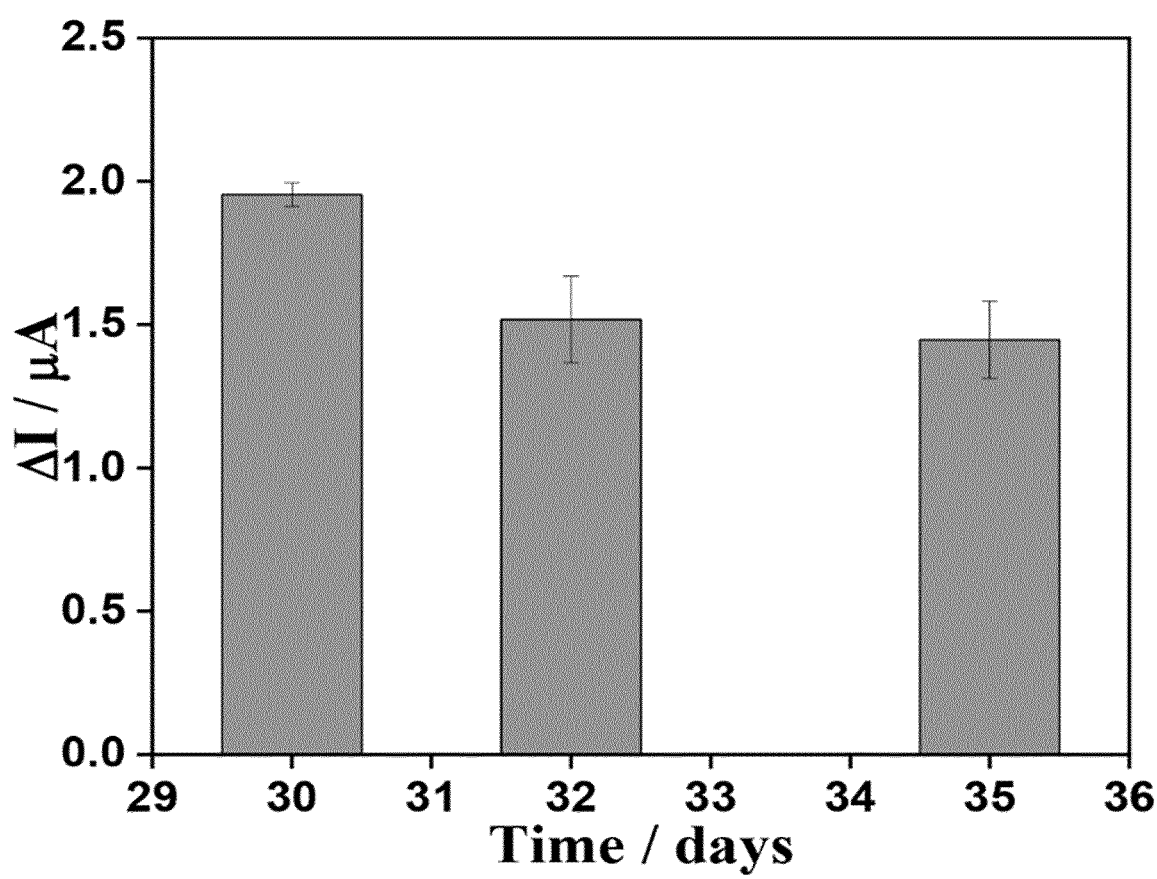
FIG. 5C is a graph illustrating the results of analyzing the electrochemical signal reduction of the electrochemical aptamer biosensor according to Example 1 at intervals of one day.

The experiment was repeated from 30 days to 35 days at intervals of 1 day in order to accurately determine an exact time, and results thereof are shown in FIG. 5C.

Specifically, FIG. 5C is a graph illustrating the results of analyzing the electrochemical signal reduction of the electrochemical aptamer biosensor according to Example 1 at intervals of 1 day.

Referring to FIG. 5C, it could be confirmed that the electrochemical signal maintained 95.6% of the original signal up to 31 days and started to decrease gradually after 32 days.

Figure 5D:
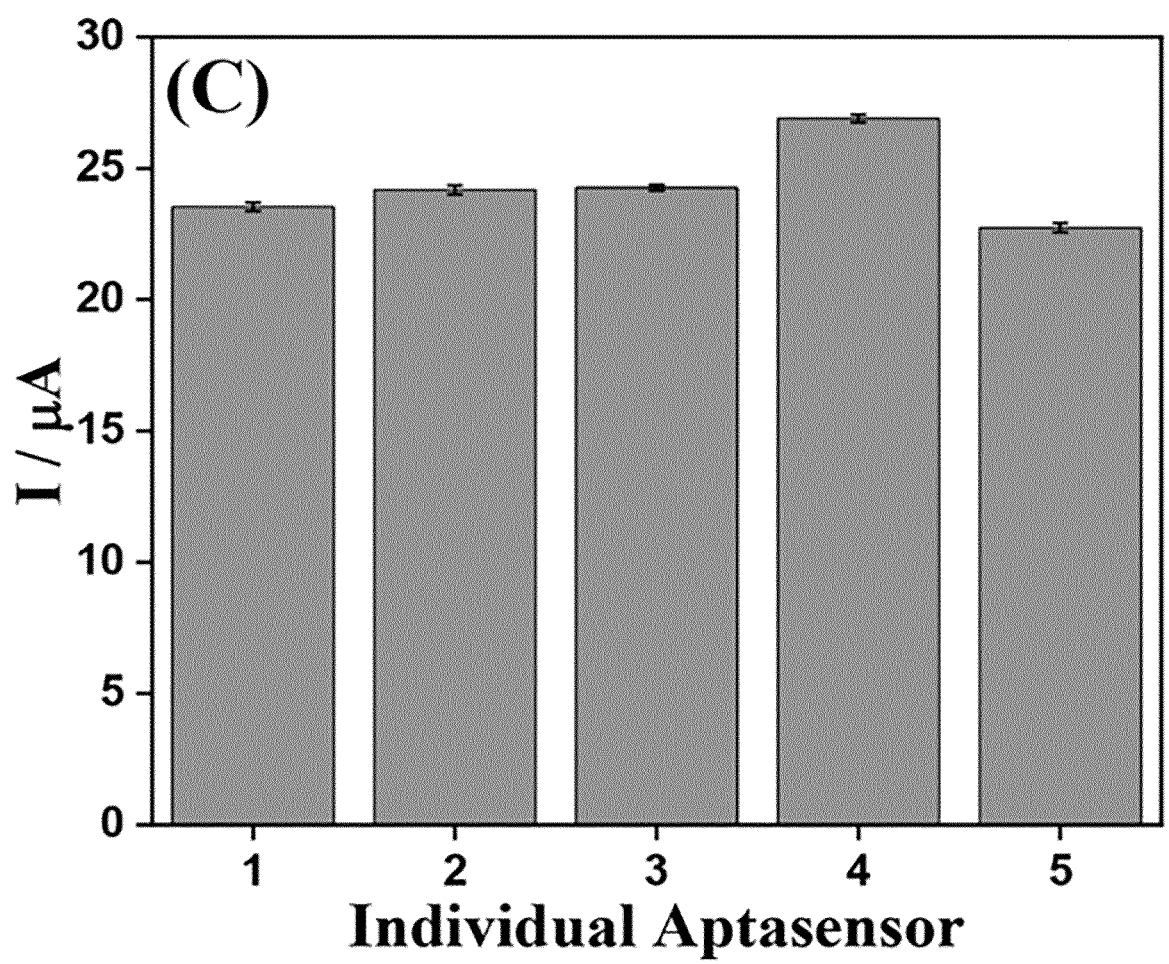
FIG. 5D is a graph illustrating the results of evaluating a difference in a blank response current of the electrochemical aptamer biosensor according to Example 1.

Meanwhile, in order to confirm the reproducibility of the electrochemical aptamer biosensor, the electrochemical aptamer biosensor according to Example 1 was prepared, and five independent measurements were used over three times to evaluate a difference in the blank response current, and results thereof are shown in FIG. 5D.

Specifically, FIG. 5D is a graph illustrating the results of evaluating the difference in the blank response current of the electrochemical aptamer biosensor according to Example 1.

Referring to this, it could be confirmed that a blank signal response has a difference of up to 4.5 µA with an average of 22 to 26.5 µA. Accordingly, it could be confirmed that the electrochemical aptamer biosensor according to Example 1 exhibits a stable response.

That is, the electrochemical aptamer biosensor according to one embodiment not only has excellent selectivity, stability and reproducibility while being simply manufactured, but can also conveniently and quickly measure a target material, and can accurately and precisely measure a concentration of the target material in a sample for analysis because the concentration of the target material, which can be measured, is wide and the detection limit is low.

What is claimed is:

1. An electrochemical aptamer biosensor comprising:
   an electrode having conductivity;
   a composite graphene oxide layer located on the electrode and including a plurality of graphene oxide plates having a sandwich structure and metal nanoparticles; and
   a plurality of target material-specific aptamers immobilized on the composite graphene oxide layer and having nanoparticles,
   wherein the composite graphene oxide layer further includes an ionic liquid, and
   the graphene oxide plates have the sandwich structure by π-π interaction with the ionic liquid,
   wherein the ionic liquid is a 1-ethyl-3-methylimidazolium (EMIM)-based ionic liquid,
   wherein the target material is a phthalate-based material,
   wherein the electrochemical aptamer biosensor is configured such that a concentration of a target material is measured through an electrochemical signal that is reduced as the target material changes a shape of each of the target material-specific aptamers having nanoparticles,
   wherein the electrochemical aptamer biosensor is configured so as to be able to measure a concentration of the target material in a range of 0.14 pg/mL to 7 ng/ml,
   wherein a detection limit of the electrochemical aptamer biosensor is 0.042 pg/mL or less.

2. The electrochemical aptamer biosensor of claim 1, wherein the electrode includes one or more selected from the group consisting of carbon (C), gold (Au), platinum (Pt), and graphite.

3. The electrochemical aptamer biosensor of claim 1, wherein the metal nanoparticles include one or more selected from the group consisting of gold (Au), platinum (Pt), and silver (Ag).

4. The electrochemical aptamer biosensor of claim 1, wherein the target material-specific aptamer includes a DNA or RNA sequence having a thiol group at a 5'-end of the aptamer.

5. The electrochemical aptamer biosensor according to claim 1, wherein the target material-specific aptamer has Thiol($C_6$) at a 5'-end of a DNA sequence given as 5'-CTT TCT GTC CTT CCG TCA CAT CCC ACG CAT TCT CCA CAT-3' (SEQ ID No. 1).

6. The electrochemical aptamer biosensor of claim 5, wherein 5'-end of the target material-specific aptamer specifically binds to the metal nanoparticles of the composite graphene oxide layer.

7. The electrochemical aptamer biosensor of claim 5, wherein the nanoparticles are bound to a 3'-end of the target material-specific aptamer.

8. The electrochemical aptamer biosensor of claim 1, wherein the nanoparticles are one or more particles selected from the group consisting of Methylene blue, Toludine blue O (TBO), Evans blue, Nile blue, and Neutral red.

9. A method of analyzing a target material, the method comprising:
   providing a sample for analysis including the target material to the electrochemical aptamer biosensor of claim 1;
   changing a shape of a target material-specific aptamer having nanoparticles by the target material; and
   measuring an electrochemical signal that is reduced due to the shape change.

10. The method of claim 9, wherein, in the providing of the sample for analysis including the target material, a time for providing the sample for analysis to the electrochemical aptamer biosensor is in a range of 5 minutes to 40 minutes.

11. The method of claim 9, wherein a use period of the electrochemical aptamer biosensor is within 35 days from the date of manufacture.

12. The electrochemical aptamer biosensor of claim 1, wherein the 1-ethyl-3-methylimidazolium (EMIM)-based ionic liquid is one or more selected from the group consisting of 1-ethyl-3-methylimidazolium tetrafluoroborate, 1-ethyl-3-methylimidazolium chloride, 1-ethyl-3-methylimidazolium trifluoroethane sulfonate, 1-ethyl-3-methylimidazolium acetate, 1-ethyl-3-methylimidazolium dicyanamide, and 1-ethyl-3-methylimidazolium ethyl sulfate.

13. A method of manufacturing an electrochemical aptamer biosensor, the method comprising:
   preparing a composite graphene oxide precursor;
   preparing a target material-specific aptamer precursor having nanoparticles;
   producing a first coating precursor by applying the composite graphene oxide precursor on an electrode having conductivity;
   producing a second coating precursor by applying the target material-specific aptamer precursor on the first coating precursor; and
   incubating the second coating precursor.

14. The method of claim 13, wherein the composite graphene oxide precursor includes a graphene oxide plate, an ionic liquid, and metal nanoparticles.

15. The method of claim 13, wherein a target material-specific aptamer having nanoparticles included in the target material-specific aptamer precursor has a concentration of 1 nM to 200 nM.

16. The method of claim 13, wherein in the incubating of the second coating precursor, an incubation time is in a range of 15 minutes to 120 minutes.

* * * * *

SEQUENCE LISTING

```
Sequence total quantity: 1
SEQ ID NO: 1           moltype = DNA   length = 39
FEATURE                Location/Qualifiers
source                 1..39
                       mol_type = other DNA
                       organism = synthetic construct
SEQUENCE: 1
ctttctgtcc ttccgtcaca tcccacgcat tctccacat                         39
```